United States Patent [19]
Aharon

[11] Patent Number: 5,661,562
[45] Date of Patent: Aug. 26, 1997

[54] TOMOGRAPHIC IMAGING SYSTEM WITH SCANNING APERTURES

[76] Inventor: Oren Aharon, 23 Shikma Street, Haifa 34739, Israel

[21] Appl. No.: 509,859

[22] Filed: Aug. 1, 1995

[30] Foreign Application Priority Data

Aug. 2, 1994 [IL] Israel ......................................... 110538

[51] Int. Cl.⁶ ..................................................... G01N 21/59
[52] U.S. Cl. ............................ 356/432; 359/235; 359/236
[58] Field of Search ............................ 356/432; 359/227, 359/233, 234, 235, 236

[56] References Cited

U.S. PATENT DOCUMENTS

| | | | |
|---|---|---|---|
| 1,842,759 | 1/1932 | Malm | 359/233 X |
| 3,002,098 | 9/1961 | Watkins | 359/235 X |
| 3,526,774 | 9/1970 | Alden | 359/233 |

*Primary Examiner*—Vincent P. McGraw
*Attorney, Agent, or Firm*—Browdy and Neimark

[57] ABSTRACT

A tomographic imaging system works with a conventional real image formed by, e.g., a lens. Scanning is over an image formation area of the image plane. A plurality of differently-oriented scanning apertures are disposed over the surface of a spinning element (disk or rotor drum). A detector is located behind the image plane for creating a signal proportional to light passing through the scanning apertures, which sweep over the image. The apertures are swept through the image plane in a first direction by the spinning of the disk or drum; they are simultaneously swept in a second direction, also lying in the image plane, that is perpendicular to the first direction, by appropriate mechanical mechanism. The simultaneous sweeps allow signal processing means to reconstruct from the detector signal a scanned image by using conventional tomographic algorithms. The device may include a variable-diameter aperture and means for moving the aperture over the image formation area; this acts as a "zoom".

7 Claims, 3 Drawing Sheets

TOMOGRAPHIC IMAGING SYSTEM WITH SCANNING APERTURES

BACKGROUND OF THE INVENTION

1. Field of the Invention

The present invention is in the field of electronic imaging devices, specifically devices where the imaging effect is generated by mechanical scanning.

2. Description of the Related Art

Imaging devices of the kind with which the invention is concerned are applicable to detectors sensitive to any part of the spectrum, such as light, X-rays, sound and others.

In the following description and claims the term "detectors" is used for an electronic device which converts waves into electrical signals;

"mozaic detector" is used to describe a two dimensional detector built from a plurality of smaller detector arranged in rows and columns;

"reconstructive tomography" is used to describe the mathematical process that combines data from multiple scanning apertures to generate images of a scanned area; and "zooming" is used to describe the effect where a small part of an image is magnified and displayed with the resolution originally used for the whole image.

Prior art imaging devices are based upon two major technologies.

One well known technique is using a mozaic detector as a sensitive element that converts light images into electronic signals and presents images to the user in a video format, as in a modern television.

The second technology is employed whenever mozaic detectors are technically impossible because of system complexity. This second technology employs single detectors, sensitive to a part of the spectrum range, in conjunction with a scanning mirror element that scans the image on the detector surface the detector generates electronic signals according to the part of the image lying on the detector surface at a specific moment. Special electronic circuitory is then used to transform the stream of signal into a video format.

On the other hand, non-imaging devices known as beam profilers are in use for measuring laser beams. Those devices use a precision blade that moves across a beam blocking light from reaching a photodetector element mounted behind the knife. For additional information, multiple knife edges each oriented in an different angle on a rotating drum move across a beam in a different direction as the drum rotates. Consequently during a rotation a set of data profiles is generated each representing the intensity profile in that direction.

This technique provides a way to generate a topographic and three dimensional low resolution intensity distribution of the incoming beam using reconstructive tomography.

Such a measuring device is disclosed in Melles Griot (company headquarters in California U.S.A.) catalog chapter 4. The catalog title is "Lasers and Instrumentation Guide." Other non imaging devices for beam profilers are disclosed in some Japanese patent applications, such as applications 1983-222404 and 60-7327. A technical review of that issue is presented in an article by John M. Fleisher and C. Breck Hitz under the title of "Gaussian Beam Profiling: How and Why" published in *Lasers & Optronics* in May 87.

The above-described devices are not applicable for imaging purposes because of their low resolution and small number of possible scans. Moreover, prior art technologies have great difficulties in zooming into an area of interest. This zooming effect is usually performed by optical special lenses or optical magnification.

It is the object of the present invention to provide an imaging system based on reconstructive tomography capable of detecting and creating an image and sensitive broad spectrum of different wavelengths implementing a non-optical, novel zooming mechanism superior to prior art devices.

SUMMARY OF THE INVENTION

In accordance with the preset invention there is provided an imaging device where the image is produced by reconstructive tomography. In a preferred embodiment, the invention includes an imaging creating element, such as a lens, and an image formation area.

The imaging device of the present invention generates the image by mechanically scanning a set of apertures through the image formation area. The set of apertures, usually rectangular, are oriented at different angles in respect with each other. The scanning action is performed in front of a detector in two direction and in a plane parallel to the detector.

The tomographic imaging device preferably has:

a detecting means sensitive to incoming signals;

an image formation area where an image is created and which lies in front of the detecting means;

a set of differently oriented scanning apertures that scan the image formation area;

scanning means that scan the set of apertures in two directions;

processing means that receive signals from the detector and reconstruct the image by means of reconstructive tomography or other mathematical processes.

According to a first embodiment, the system includes a rotating drum equipped with a plurality of slit apertures. The drum rotates in front of a detector which measures the amount of radiation that passes through the slit. The rotating drum has a large diameter compared to the image formation area, consequently its rotation in front of the detector generates a substantially linear motion parallel to the detector surface and scanning through the image formation area.

Each slit generates a different pattern as it passes through the detector.

In addition, for achieving the required resolution the system is equipped with a second motor that further rotates the rotating drum in a perpendicular direction to the first rotation. The additional motor provided the rotary motion to the rotating drum detector assembly by being directly keyed to said assembly or by a mechanical reduction.

Consequently the first preferred embodiment is a tomographic imaging device where the scanning of said set of apertures is performed by:

a rotating drum, in the perimeter of which a set of differently oriented apertures are mounted;

motor means keyed to said rotating drum;

detector means deployed after the drum;

image formation area scanned by the drum & apertures assembly;

second motor means perpendicularly keyed to the first motor drum assembly to provide a second rotational motion perpendicular to first rotational motion.

Each drum rotation provides a set of different patterns according to the number of mounted slits on the drum, when the second motor rotates the assembly of the drum detector another set of different pattern is generated.

The overall number of different patterns generated by the system is the number of slits mounted on the drum multiplied by the number of different positions generated by the second motor.

The signals generated by the detector are digitized and processed by a processor means that mathematically combines the information to reconstruct the scanned image by reconstructive tomography.

According to a further embodiment, a controlling aperture is disposed at the image formation area. This controlling aperture down-controls the size of the image formation area causing the scanning apertures to scan an area which is substantially smaller than the size of the original image formation area. Since the number of scans remains unchanged the reconstructed image will have the size of the controlling aperture with the same effective number of scans. Consequently, a smaller area with the same resolution will be displayed, thus creating the required zooming effect.

By varying the size of the controlling aperture a varying zooming effect is achieved. Consequently, the zooming tomographic device of the above embodiment includes:

the combination of the embodiment already disclosed with a controlling aperture mounted at the image formation plane;

means for scaling up and down the size of the controlling aperture in the image formation plane.

Another preferred embodiment further includes different means for scanning the set of apertures in two directions:

rotating disk on the front surface of which the set of differently oriented apertures are mounted;

motor means keyed to the rotation disk;

second motor means parallel keyed to the first motor disk assembly to provide a second rotation substantially parallel to first rotation and concentric with the image formation area;

detecting means parallel to the image formation area.

BRIEF DESCRIPTION OF THE DRAWING

The above and other objects and the nature and advantages of the present invention will become more apparent from the following detailed description of embodiments taken in conjunction with drawings, wherein.

DETAILED DESCRIPTION OF THE PREFERRED EMBODIMENTS

Figure 1:
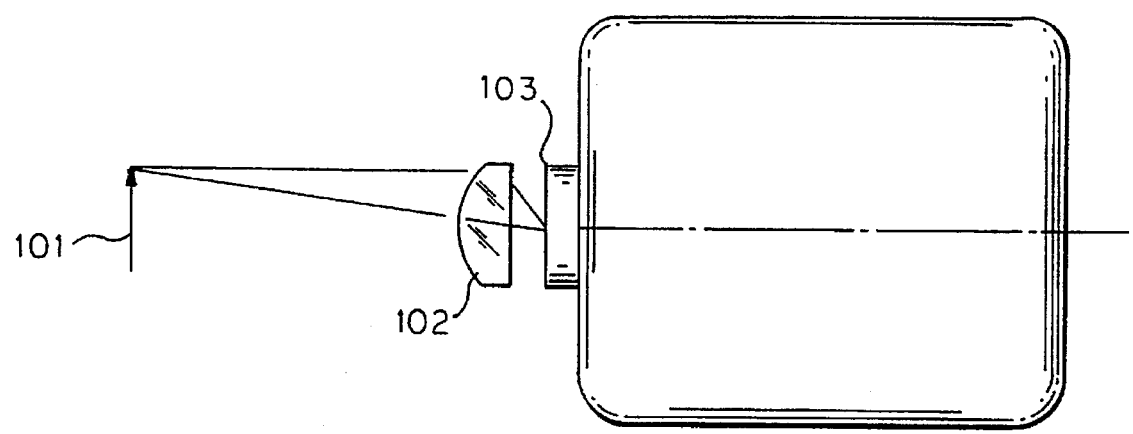
FIG. 1, labeled "prior art", is a schematic view of an imaging system.

In FIG. 1 a prior art imaging device is disclosed, where the detecting element is a mozaic detector.

The object 101 is imaged by a lens element 102 onto a mozaic detector 103 which transforms the image into electronic signals.

Figure 2:
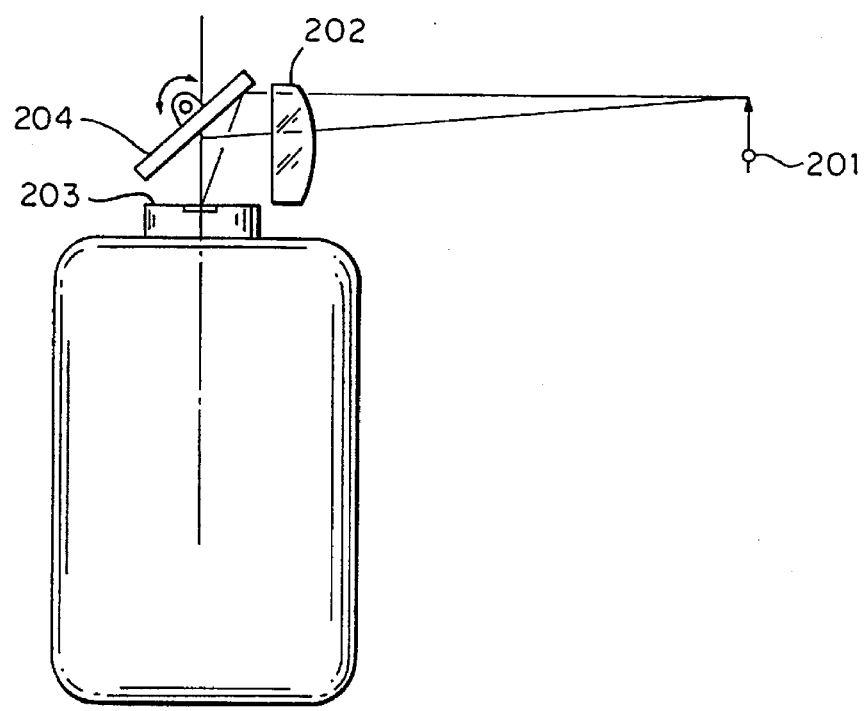
FIG. 2, labeled "prior art", is a schematic view of another imaging system.
Figure 3:
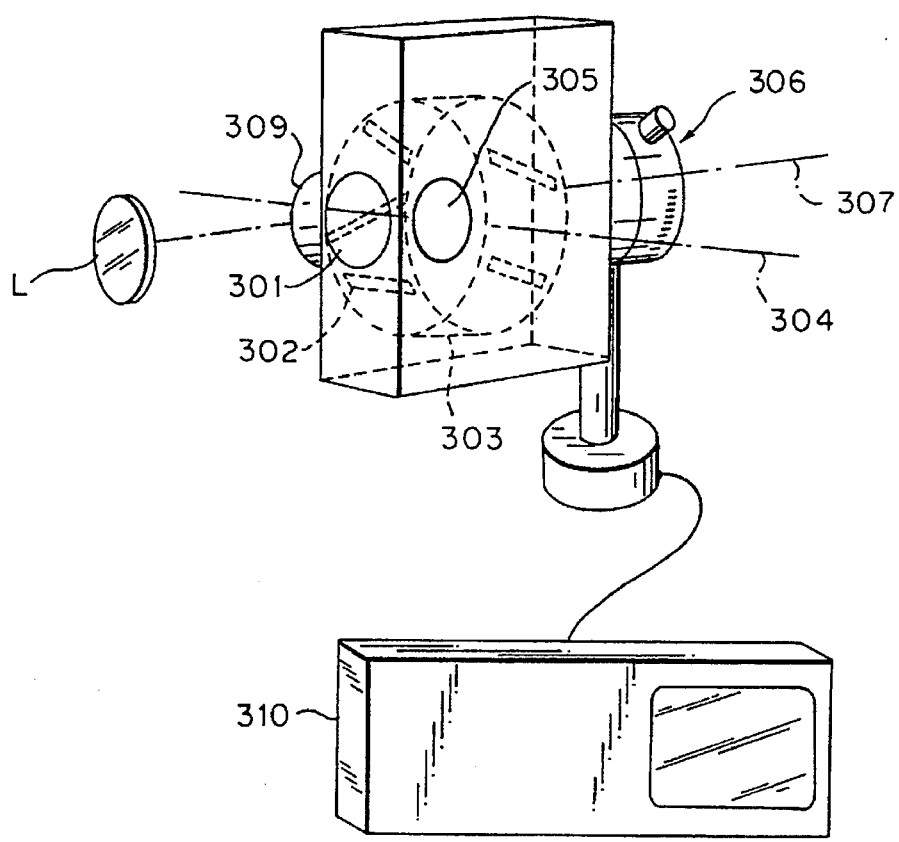
FIG. 3 is a perspective view of a first embodiment of the present invention.

In FIG. 2 a different prior art imaging device is disclosed in a schematic way, where the image is created by scanning the object on a single detector by mirror means.

The object 201 is first imaged by lens means, 202, then reflected by a scanning mirror 204 to be imaged on a single detector 203.

The detector is substantially smaller than the required image and the scanning action of mirror 204 is to scan across the detector surface the required image and the scanning action of mirror 204 is to scan across the detector surface the required image.

Referring to FIG. No. 3 there is shown a tomographic imaging device according to the present invention where the image is formatted at plane 301 by some optical means L. The image plane is scanned by a set of rectangular apertures, denoted 302, each oriented at a different angle with respect to each other at the perimeter of a rotating drum 303 which rotates by motor means 309 around axis 304.

The scanning apertures allow only a part of the electromagnetic radiation at the image plane to penetrate through the apertures and reach a detector 305.

The rotating drum detector assembly is further keyed to a second motor (306) rotating the system around an axis (denoted 307) which is substantially perpendicular to axis 304 and substantially concentric to, perpendicular to and centered on, the image plane. The said second motor oscillates the drum assembly through a limited angle to generate an additional set of scanning directions allowing multiple scans to be taken. The overall scanning direction of the system are given by the formula $N = m \times n$, where N is the total number of scanning directions, m is the number of apertures on the rotating drum, and n is the number of different positions of the second motor 306.

Signal processor and display means 310 receives the signals from the detector 305.

Figure 4:
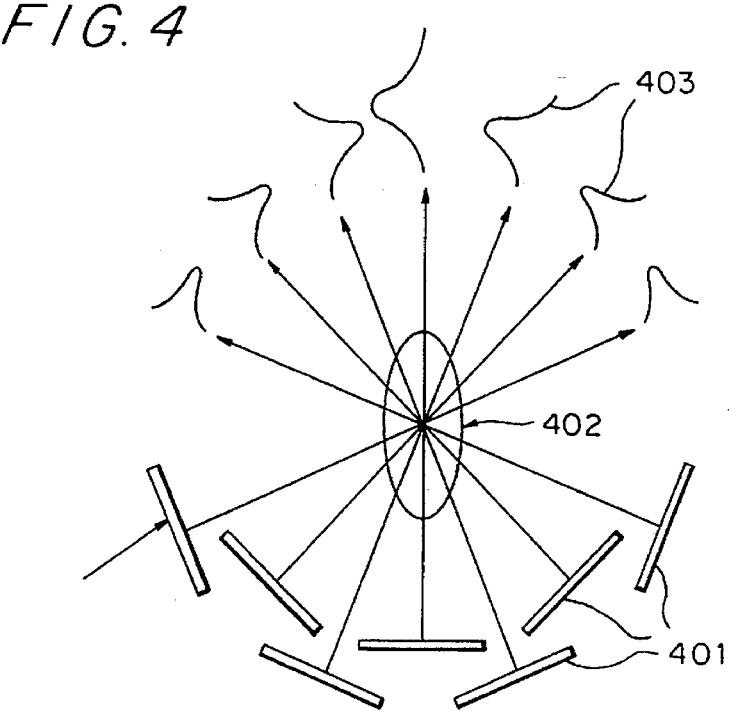
FIG. 4 is a schematic-graphical view according to the present invention.

FIG. 4 is a graphic illustration of the image formation area showing that by scanning the image formation area with differently oriented rectangular apertures denoted as 401 passing through the image formation plane (402) a set of different signals (403) will be generated. Each signal is a function of aperture orientation, the scanned image, and the scanning speed. Feeding the signals 403 to a processor means (not shown) and using reconstructive tomography the said original image 402 is reconstructed.

Figure 5:
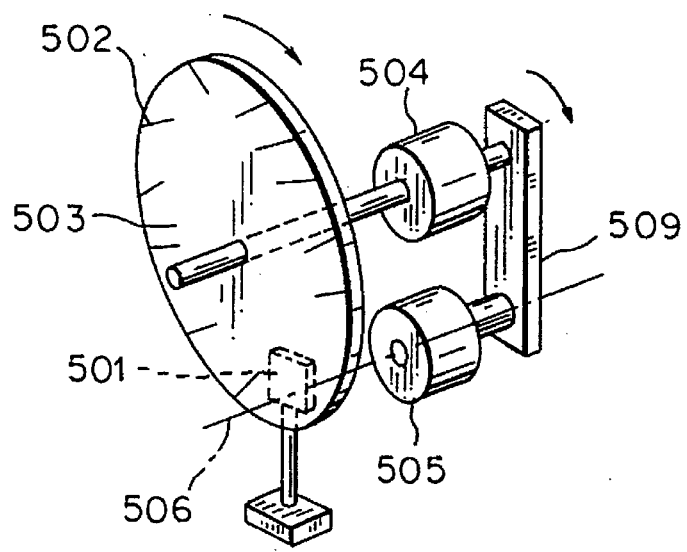
FIG. 5 is a perspective view of a second embodiment of the present invention.

Referring to FIG. 5, there is shown a tomographic imaging device where the image is formatted at plane 501 by some optical lens (not shown.) The image plane is scanned by a set of apertures 502 each oriented at a different angle with each other.

The scanning apertures are mounted on the surface of a disk 503, the plane of which rotates within the image formation plane. The disk rotation is achieved by an additional motor means 504 keyed to the disk.

The rotating motor disk assembly is further keyed to an additional motor 505 which is substantially parallel to the first motor and rotates the disk assembly around an axis 506, which is substantial concentric to perpendicular to and centered on, the image formation area.

According to a further embodiment, the motor is keyed to rotating elements through mechanical reduction means, such as gear box 509.

Figure 6:
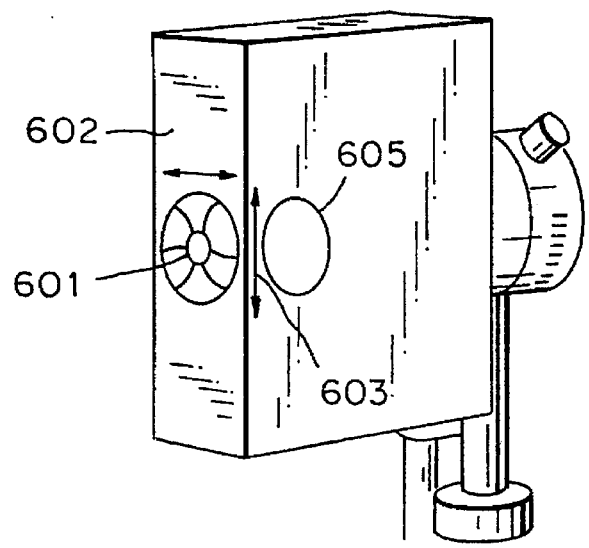
FIG. 6 is a perspective view of a third aspect of the present invention.

FIG. 6 there is shown a tomographic imaging device where the image formation plane is equipped with a variable controlling aperture 601 that down-controls the image formation area. By moving the controlling to different areas on said image formation plane along directions denoted 602, 603 the controlling aperture is disposed anywhere in the image formation are allowing zooming of any part of image formation area.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. For scanning a real image, the image being created by a light-focussing element and disposed in an image plane over an image formation area; a tomographic imaging device comprising:

a plurality of differently-oriented scanning apertures;

means for sweeping the scanning apertures across the image formation area in a first direction, the first direction lying in the image plane;

means for turning the direction within the image plane;

a detector, located adjacent the apertures distal the light-focussing element, for creating a signal proportional to an intensity of light passing from the light-focussing element through any one of the scanning apertures in the image plane; and signal processing means for reconstructing a scanned image from the signal according to an algorithm, the algorithm being selectively tomographic and a mathematical formula.

2. The tomographic imaging device according to claim 1, wherein:

the means for sweeping comprises a drum having a cylindrical surface, the cylindrical surface concentric with a cylinder axis, and means for spinning the drum;

the plurality of differently-oriented scanning apertures are disposed over the cylindrical surface; and the means for turning comprises means for rotating the cylinder axis about a rotation axis perpendicular to the cylinder axis and the image plane.

3. The tomographic imaging device according to claim 1, wherein:

the means for sweeping comprises a disk having a circular flat surface, perpendicular to disk axis, and means for spinning the disk;

the plurality of differently-oriented scanning apertures are disposed over the flat surface; and the means for turning comprises means for revolving the disk axis about a rotation axis parallel to the disk axis and perpendicular to the image plane.

4. The tomographic imaging device according to claim 3, wherein the means for spinning is coupled to the means for revolving through a mechanical reduction means.

5. The tomographic imaging device according to claim 3, wherein the rotation axis and the disk axis are separated by a distance such that the scanning apertures are swept over the image formation area throughout a revolution of the disk axis.

6. The tomographic imaging device according to claim 1, comprising means for controlling the size of the image formation area.

7. The tomographic imaging device according to claim 6, wherein the means for controlling the size of the image formation area further includes a variable-opening controlling aperture and means for translating the controlling aperture parallel to the image plane over the image formation area.

* * * * *